US005295392A

United States Patent [19]

Hensel et al.

[11] Patent Number: 5,295,392

[45] Date of Patent: Mar. 22, 1994

[54] PIPE TESTING EQUIPMENT

[75] Inventors: Frederick W. Hensel; Mark F. Hensel, both of Butler, Pa.; Steve D. Sandstrum, Kingwood, Tex.; John Coleman, Sugarland, Tex.; John H. Parnell, Houston, Tex.; Stephen J. Boros, Friendswood, Tex.

[73] Assignee: Tech Team, Inc., Butler, Pa.

[21] Appl. No.: 858,068

[22] Filed: Mar. 26, 1992

[51] Int. Cl.$^5$ .............................................. G01M 3/28

[52] U.S. Cl. .......................................... 73/49.5; 73/37

[58] Field of Search ...................... 73/49.5, 49.6, 49.1, 73/40.5 R, 37

[56] References Cited

U.S. PATENT DOCUMENTS

| | | | |
|---|---|---|---|
| 3,383,905 | 5/1968 | Servos et al. | 73/49.5 X |
| 3,398,573 | 8/1968 | Lloyd | 73/49.5 |
| 3,566,675 | 3/1971 | Ledebur | 73/49.5 |
| 4,416,146 | 11/1983 | Ambrose | 73/49.5 |

FOREIGN PATENT DOCUMENTS

| | | | |
|---|---|---|---|
| 692833 | 8/1964 | Canada | 73/49.5 |

*Primary Examiner*—Hezron E. Williams
*Assistant Examiner*—Joseph W. Roskos
*Attorney, Agent, or Firm*—George C. Atwell

[57] ABSTRACT

A hydrostatic test system for subjecting a workpiece or test specimen to a predetermined test pressure until the workpiece fails by developing a leak detectable by the test system. The hydrostatic test system is a modular system readily adaptable to, and able to incorporate therein, a number of different physical devices for regulating, controlling, detecting, and registering functions and activities pertaining to leak detection. Among the devices adaptable in the hydrostatic test system for detecting a leak condition in the workpiece is a differential pressure switch and a static pressure switch, a combination differential and static pressure switch, or an accumulator associated with either a pressure transducer or a high accuracy transducer. The leak condition may be visually signaled by a lamp or indicator light or the sensing of a leak condition may be visually output to a CRT screen. The hydrostatic test system includes a number of test stations mounted in a large upright cabinet or unit, with each test station accommodating one test specimen. The aggregate failure times and pressures can be output and displayed on a plotter and printer in the computer-controlled embodiment of the hydrostatic test system.

8 Claims, 6 Drawing Sheets

28
30
80
56
74
78
76
34
70
72
68
66
60
62
65
54
58
79
64

PIPE TESTING EQUIPMENT

BACKGROUND OF THE INVENTION

This invention relates to pressure testing equipment, and more particularly pertains to a hydrostatic test system for subjecting a number of test specimens to a predetermined test pressure for determining when each test specimen develops a leak condition.

Any article, item, or workpiece subjected to some kind of pressure, such as air or a liquid, should be tested to determine its allowable working pressure, its psi. rating, and its estimated working lifetime when subjected to any given working pressure. The workpieces requiring testing can include a wide variety of pipes, such as drill pipe, gas pipe, plastic pipe, as well as plastic containers and glass bottles. The test system should include a number of test stations for simultaneously testing a number of workpieces with a high degree of accuracy and repeatability.

For example, the Fujii et al. U.S. Pat. No. 4,571,986 discloses a pneumatic pipe leak tester which includes several conduits each of which is connectible to a pipe to be tested. The Fujii et al. patent also includes a pressure transducer for producing an output signal and a detector actuated by the transducer for producing a leak signal.

However, there remains a need for a test system which can simultaneously test a large number of workpieces or test specimens, has a high degree of accuracy and repeatability, and is modularly designed in order to vary the number of test stations and accommodate a number of different electrical and mechanical pressure sensing devices.

SUMMARY OF THE INVENTION

In view of the above-mentioned problems, the present invention has as its object the provision of a hydrostatic test system for detecting leak conditions occurring within test specimens as a result of the specimens being subjected to a constant, predetermined test pressure.

A primary object of the present invention is to provide for the simultaneous pressure testing of a large number of test specimens.

Another object of the present invention is to provide a test system that can subject test specimens to very low to very high test pressures, and can detect differential pressure conditions ranging from very low to very high.

Still another object of the present invention is to provide a modularly designed test system whereby testing stations can be increased or decreased thereby increasing or decreasing the number of specimens to be tested.

Yet another objective of the present invention is to provide a test system which can accommodate a number of pressure sensing devices. The pressure sensing devices can include, for example, a static pressure switch and a differential pressure switch, a combination differential and static pressure switch, a high accuracy transducer, a pressure transducer, diaphragm-type pressure switches, and electronic differential pressure switches and sensors.

It is still another object of the present invention to provide a test system which is either manually operated or computer monitored and controlled.

The test system of the present invention comprehends a large testing cabinet having a plurality of modular, removably securable station control panels. Each station control panel includes a number of test stations with each test station for controlling and monitoring the pressure testing of one test specimen.

The test system can be adapted for manually controlled and operated elements or computer controlled and operated elements. In the manually operated test system, the various elements can include pressure gauges, pressure regulators, flow control valves, timers, and station pilot or indicator lights. The pressure sensing means can be either a static pressure switch and a differential pressure switch, or a combination differential and static pressure switch. When a differential condition occurs as a result of the test specimen developing a leak, the indicator light goes out thus visually signaling to the operator that the test specimen has failed the test.

The test system of the present invention can also be adapted for computer controlled testing. In the computer controlled test system, an accumulator and either a pressure transducer or a high accuracy transducer are utilized in the sensing of a differential pressure condition. If the pressure transducer is utilized, the pressure transducer generates output signals upon sensing pressure variations in the test system concomitant with the occurrence of a leak condition. The signals can be channeled through some type of computer interface module to a desk top computer.

The above objects, features, and advantages of the present invention will become apparent from the following description and appended claims, taken in conjunction with the accompanying drawings, which are illustrative of several embodiments of the invention.

DETAILED DESCRIPTION OF THE PREFERRED EMBODIMENT

Figure 1:
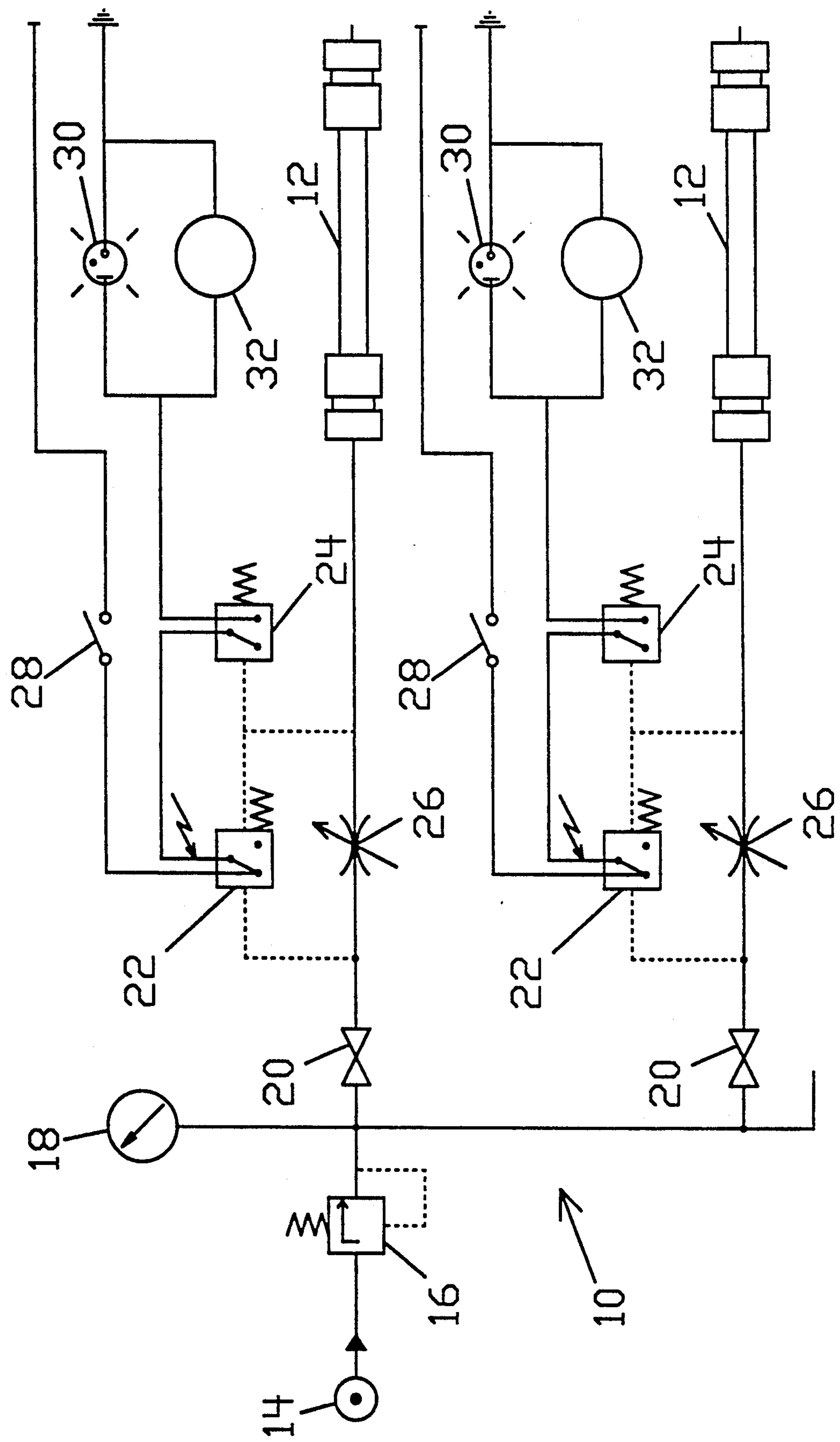
FIG. 1 is a combined electrical and hydrostatic schematic diagram of a test system using a differential pressure switch and a static pressure switch.
Figure 2:
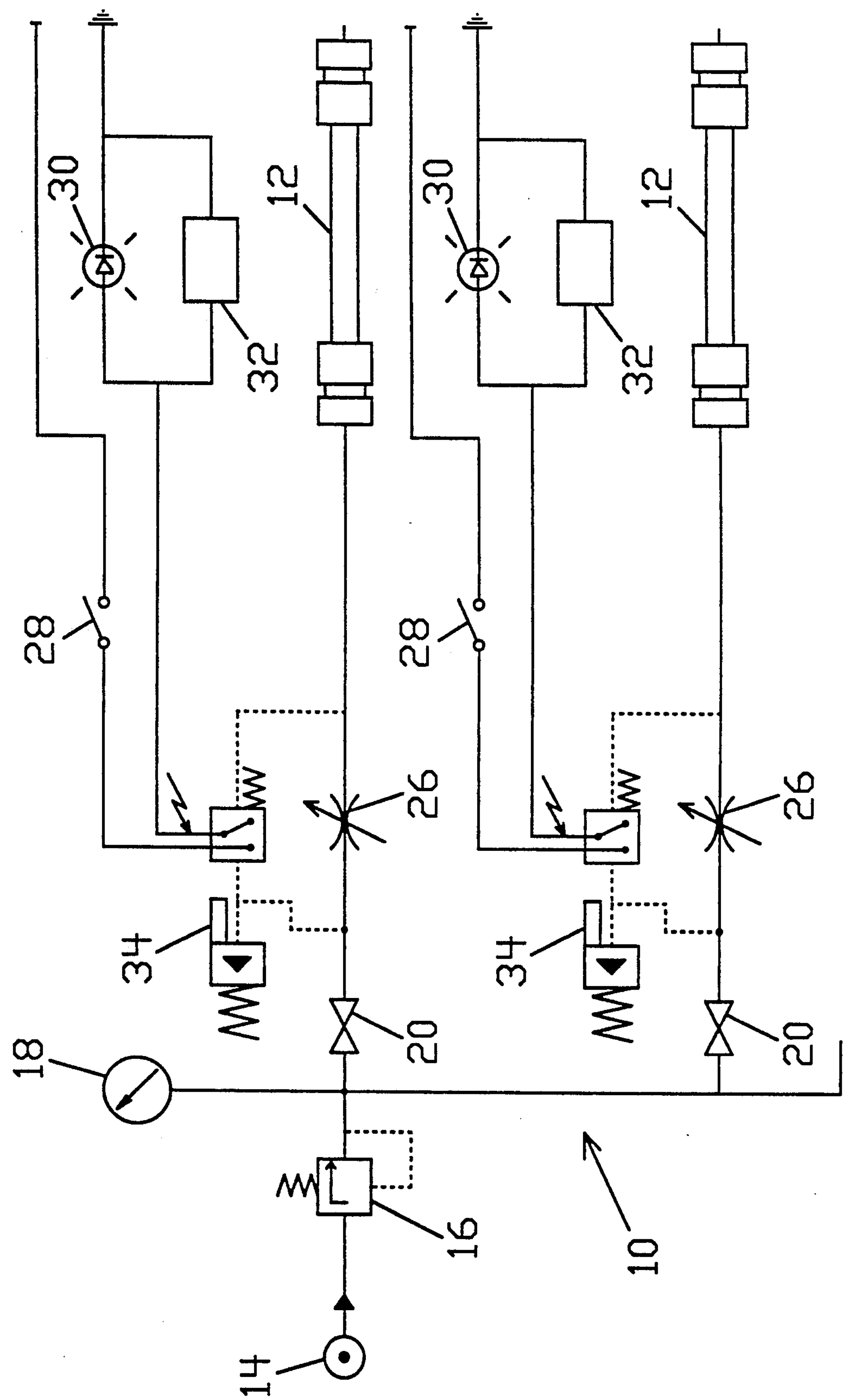
FIG. 2 is a combined electrical and hydrostatic schematic diagram of a test system using a combination differential and static pressure switch.

FIGS. 1 and 2 illustrate an embodiment of the pipe testing system of the present invention. More specifically, the pipe testing system of the present invention is a hydrostatic test system 10 for pressure testing specimens or workpieces 12 such as various types of pipe or tubing, including drill pipe, water pipe, gas pipe, and plastic pipe. However, any structure or item which is subjected to pressure during its working life can be adapted for pressure testing by the present invention. Such items or structures as plastic containers and glass bottles may also be pressure tested by the present invention.

Referring to FIG. 1 there is shown the hydrostatic test system 10 according to the present invention which includes a means for supplying fluid pressure to the system 10. The means for supplying fluid pressure to the system 10 is a long-life, high-pressure, high-volume pump 14, rated to at least 3,000 psi., a pressure regulator 16, and a pressure gauge 18. The regulator 16 regulates pressure within the system 10 and can be used to reduce a high primary pressure to a lower secondary value. The gauge 18 is used for taking high accuracy pressure measurements within the system 10. The pump 14, the regulator 16, and the gauge 18 are all conventional in the art. An on/off valve 20, which may be some type of shut-off or gate valve conventional in the art, is used to control fluid flow into the system 10.

A pressure sensing means is used for sensing a differential pressure condition occurring within the system 10 as a result of the specimen 12 developing a leak after being subjected to a given test pressure for a given period of time. The pressure sensing means as shown in FIG. 1 is a differential pressure switch 22. Co-pending patent application Ser. No. 07/858,069, filed on even date herewith, discloses a pure differential switch which is utilized in the invention shown in FIG. 1. In addition, FIG. 1 shows a static pressure switch 24, which includes some type of static or preset piston. A calibration means is used for setting, regulating, and varying the flow rate to the pressure sensing means. As shown in FIG. 1, a flow control valve 26, conventional in the art, is used. The valve 26 may be a variable flow control valve, also known as a fine metering valve. The valve 26 of the present invention is set generally at two turns open to regulate the flow rate to the differential pressure switch 22. The valve 26 disclosed in the present invention is also described in the aforementioned copending patent application Ser. No. 07/858,069. For each test station of the system 10 as shown in FIG. 1, there is a station on/off switch 28 which is manually controlled and operated.

As shown in FIG. 1, an indicator means is utilized for visually signaling to the operator that no differential condition exists within the system 10 during pressure testing of the specimen 12; also the indicator means is utilized for signaling to the operator when a differential pressure condition occurs within the system 10 and is detected by the differential switch 22. In the system 10 of FIG. 1, DC LED lights 30 are utilized although other types of indicator lights, such as neon lamps, can also be used. Because this test system 10 utilizes a time-to-failure test, a timer is needed for accurately timing each test run. Specimens 12 can be subjected to a test pressure for days, weeks, months, and even years until they develop a leak which causes a differential pressure condition within the system 10 detectable by the differential switch 22. It is for this reason that a very accurate timer must be utilized.

A number of parameters must be considered when subjecting the specimens 12 to a test pressure. Among the factors are the type of test specimen, i.e., the strength, material, and particular type of pipe or tubing being tested. The test pressure to which the specimen 12 is subjected is another factor. The system 10 as shown in FIG. 1 can subject the specimen 12 to pressures ranging from very low to very high, up to at least 3,000 psi. The differential switch 22 produces accurate and repeatable results within this pressure range. The flow setting of the valve 26 must also be considered. One standard flow setting utilized in the system 10 of FIG. 1 is 32 cubic centimeters per minute leak detection rate at 150 psi.

In operation, the hydrostatic test system 10 shown in FIG. 1 is completely pressurized by a fluid, such as water. Since the switch 22 is a pure differential switch and only detects when a differential pressure condition is occurring within the system 10, the static switch 24 is utilized to register a minimum predetermined static pressure. In the system 10 of FIG. 1 a minimum predetermined static pressure of 50 psi. must be in the system 10 before pressure testing of the specimen 12 can occur. The pre-set piston of the static switch 24 is a gross indicator of pressure and, after it registers that there is at least a 50 psi. minimum static pressure within the system 10, the testing of the specimen 12 can commence. By manually operating and monitoring the pump 14, the regulator 16, and the gauge 18, the system 10 is brought up to a given test pressure so that the pressure being exerted on the specimen 12 is equal to the pressure throughout the system 10. Eventually the specimen 12 develops a leak. A pressure drop or pressure differential results across the orifice of the flow control valve 26. The pressure within the system 10 coming into the valve 26 is now greater than the pressure being exerted on the specimen 12. The differential switch 22 detects the differential pressure condition occurring within the system 10 and is forced away from an electrical signaling means, which may be a proximity detector such as a reed switch, which is also part of the structure of the differential switch 22. The reed switch opens to a nonsignaling, nonconducting off state, thus shutting off the indicator light 30. This indicates to the operator that a leak has developed in the specimen 12 and a differential pressure condition has occurred within the system 10 which was detected by the differential switch 22. The test is over for this particular specimen 12. This also stops the timer 32 which indicates the lifetime of this specimen under this pressure condition. The operation of the differential switch 22 shown in FIG. 1 was described in detail in, the aforementioned copending patent application Ser. No. 07/858,069.

The system 10 of FIG. 1 is also shown in FIG. 2. The one significant change is that the system 10 of FIG. 2 utilizes a combination differential and static pressure switch 34 to detect a differential pressure condition occurring within the system 10. The combination switch 34 shown in FIG. 2 is also disclosed in copending patent application Ser. No. 07/858,069. The switch 34 registers a minimum predetermined static pressure within the system 10 and also detects when a differential pressure condition is occurring therein due to a leak condition occurring in the test specimen 12.

The switch 34 shown in FIG. 2 combines both a differential piston for sensing a differential pressure condition and a static, or preset piston, for registering a minimum predetermined static pressure within the system 10. The minimum predetermined static pressure within the test system is 50 psi.: when this minimun predetermined test pressure is attained along with no differential pressure condition existing therein, testing of the specimen 12 can commence.

The system 10 can be pressurized ranging from very low to a very high pressure of, for example, 3,000 psi. With the calibration of the valve 26 set at two turns open, which is a standard set point, and the timer 32 running, the specimen 12 is subjected to the test pressure. A drop in pressure across the orifice of the valve 26 will occur simultaneously with a leak condition developing in the specimen 12. The differential pressure condition that is now occurring in the system 10 will be detected by the combination switch 34 causing the differential piston to back away from the static piston. This causes the reed switch to change from a conducting, signaling on state to a nonconducting, nonsignaling off state. When the reed switch is changed to the nonconducting off state due to the differential piston backing away as a result of the occurrence of the differential pressure condition, the indicator light 30 will go out and the timer 32 will stop, thus signaling to the operator that the specimen 12 has failed the test.

Figure 3:
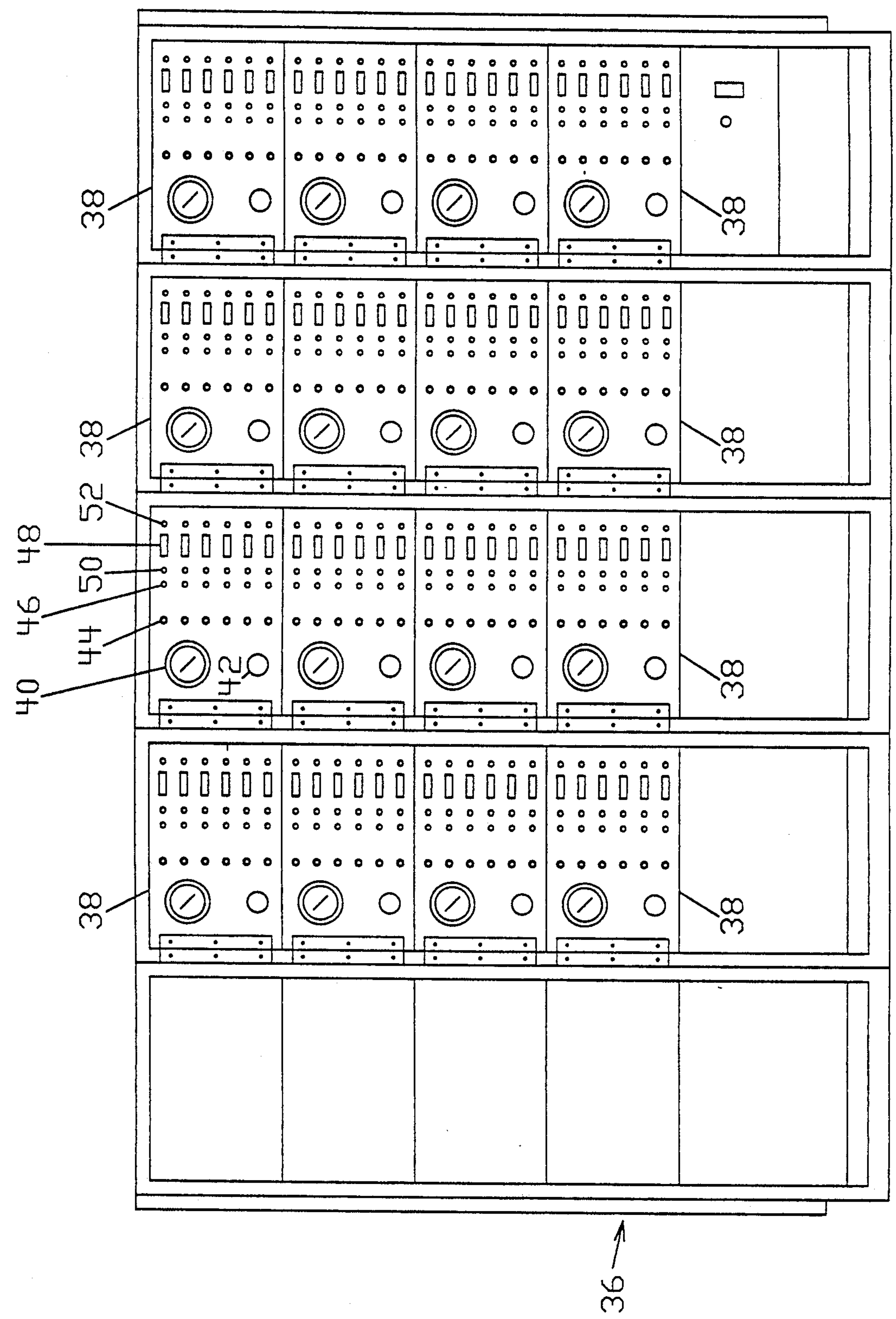
FIG. 3 is a front elevational view of a test system cabinet showing the arrangement of the station control panels.
Figure 4:
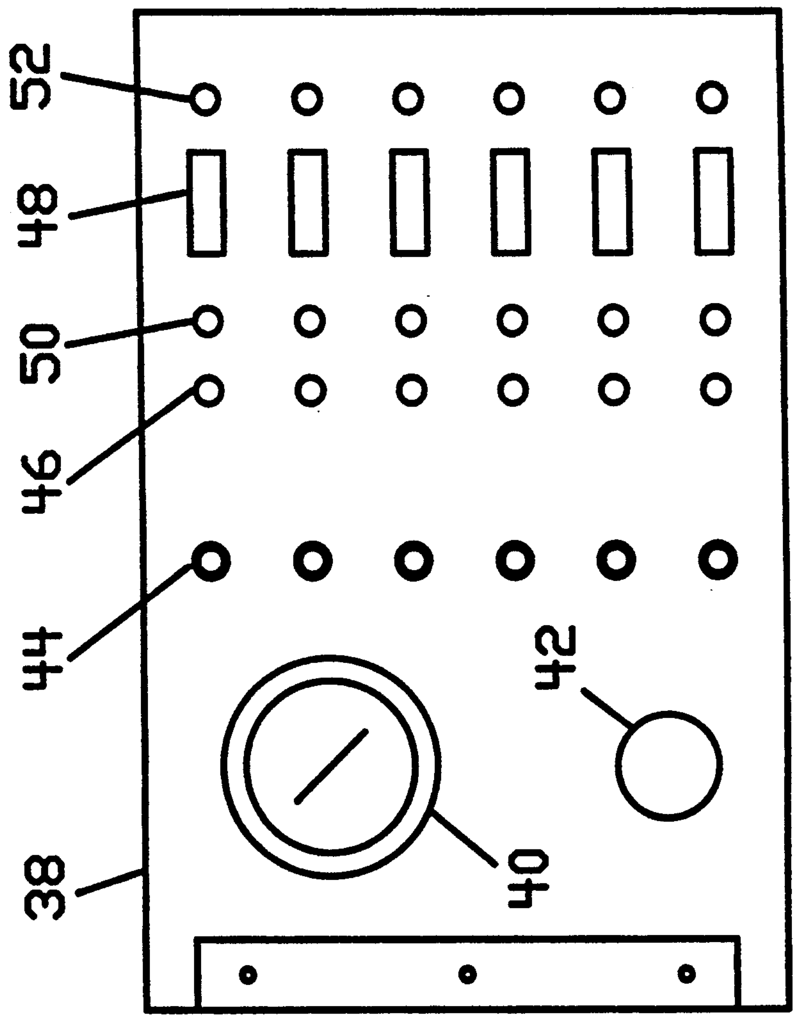
FIG. 4 is an enlarged front elevational view of one of the station control panels first shown in FIG. 3.

FIGS. 3 and 4 are illustrative of one preferred design or configuration for a test stand or cabinet 36 for the system 10 shown in FIGS. 1 and 2. The cabinet 36 is a modularly designed unit so as to give the user great flexibility in the number of specimens that can be tested. Sixteen test station control panels 38 are shown mounted on the cabinet 36 of FIG. 3, and each control panel 38 is modularly designed so as to be removably securable to the cabinet 36, preferably by a hinging means. The control panels 38 shown in FIG. 3 are manually operated, monitored, and controlled, and each control panel 38 includes the following elements: a static pressure gauge 40, a static pressure regulator 42, a station on/off valve 44, a station orifice valve 46, a station timer 48, a station pilot light 50, and a station on/off switch 52. More specifically, each control panel 38 shown in FIG. 3 includes one pressure gauge 40, one pressure regulator 42, six on/off valves 44, six orifice valves 46, and six timers 48, as well as six pilot lights 50, and six on/off switches 52. With six work stations per control panel 38 and sixteen control panels 38 shown in this embodiment of the cabinet 36, there are a total of 96 work stations or testing stations in all. The far side of the test system cabinet (not shown) will have the same number of station control panels and test stations, giving this configuration of the test system cabinet 36 a total of 192-work or testing stations. Because each control panel 38 includes six test stations, each control panel 38 can simultaneously test six specimens. Each on/off switch 52 may be a manually-operated toggle switch and each timer 48 has at least one digit to the right of the decimal point and at least five digits to the left of the decimal point to allow for long term testing of the test specimens. The system 10 of FIGS. 1–4 is designed so that in each control panel 38 the test pressure is maintained in the remaining specimens 12 after the failure of individual specimens 12. Because of the modular design of the cabinet 36, the number of control panels 38 can be increased or decreased to fit each particular user requirement.

Figure 5:
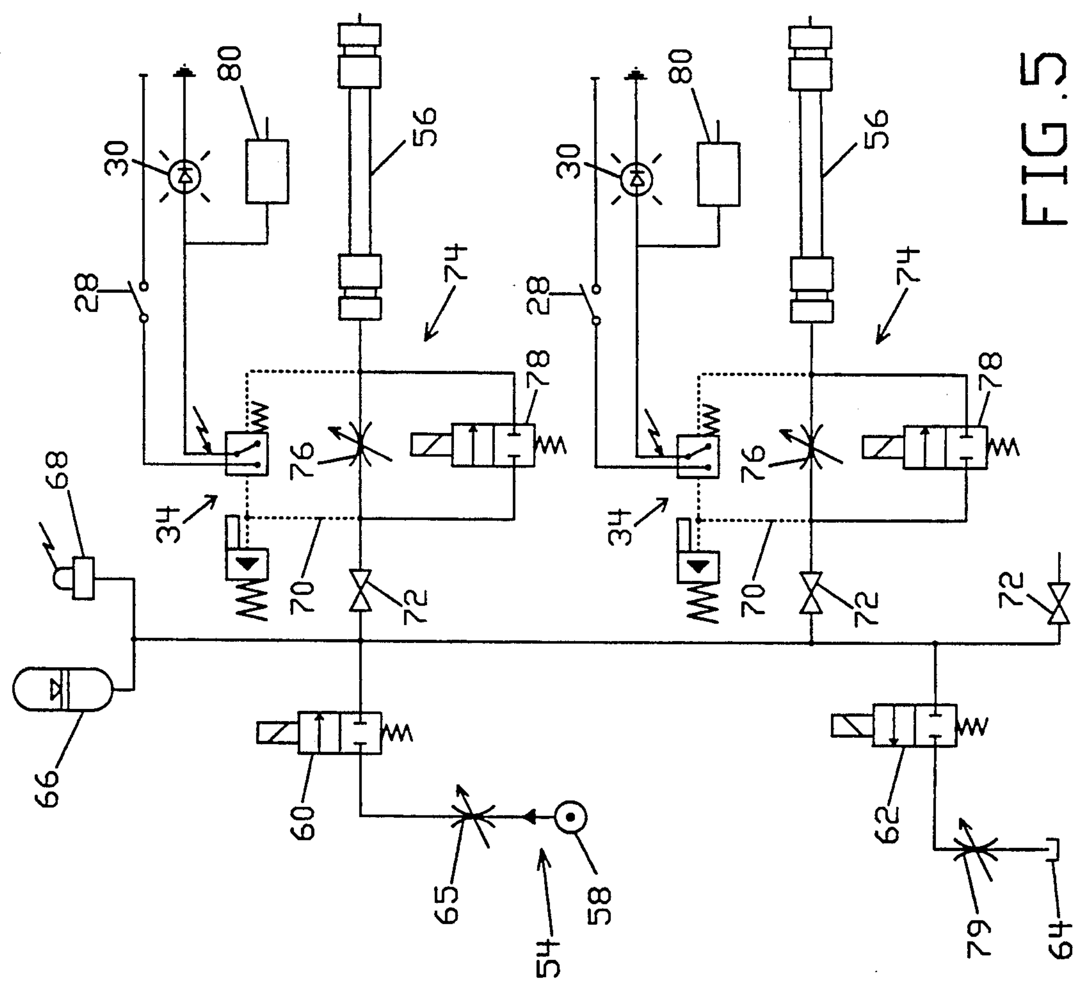
FIG. 5 is an electrical and hydrostatic schematic diagram of a computer-controlled hydrostatic test system using a transducer.

Referring to FIG. 5 there is shown a computer-controlled, long-term hydrostatic test system 54 for testing a plurality of workpieces or test specimens 56, such as various kinds of pipe. The system 54 of FIG. 5 illustrates two of the six work stations and includes a pressure supply means for supplying fluid pressure to the system 54. The pressure supply means can include a long-life, high pressure, high volume pump 58 and a fluid source. The pump 58 may be rated and operated from 500 psi. to 3,000 psi. and is conventional in the art. A pressure regulating means is used for maintaining a set pressure within the system 54 after pressure has been introduced therein. The pressure regulating means includes an inlet-60 and an outlet 62 electrically operated, two-way solenoid valve. The solenoid valves 60 and 62 are computer controlled and actuated in response to any demand or expansion in the specimens 56, i.e., the particular pipes being tested. An electronic control and monitoring means, such as a desk top computer, determines which of the solenoid valves 60 and 62 to open or close on the basis of signals received. Over the course of a test the various kinds of pipes being tested have a tendency to expand, and there must be some means for filling up each particular pipe so as to maintain a uniform set pressure within the system 54. This is not a leak, condition occurring in the pipe; it is a slow expansion over time. For example, if one of the specimens 56 should start to expand and cause a demand on the system 54, this would be detected, and then the inlet solenoid valve 60 would open up to allow fluid to fill in the specimen 56 in order to maintain a uniform set pressure throughout the system 4; if the temperature should happen to rise and cause a pressure increase within a particular specimen 56, then the outlet solenoid valve 62 can be opened up to allow fluid to drain into a tank 64 thereby maintaining the set pressure within the system 54. The inlet valve 60 has a variable flow control or needle valve 65 in line with it for regulating fluid flow into the system 54 which insures a slow steady flow for allowing a slow pressure increase on the specimen 56.

Referring to FIG. 5, the system 54 also includes an accumulator 66 and a high accuracy transducer 68. The accumulator 66 is essentially a fluid pressure storage chamber in which the potential energy of a liquid under pressure can be stored against a compressible force of gas in order to do useful work. The accumulator 66 stores fluid under pressure and can discharge fluid into the system 54 or can fill with fluid concomitant with pressure variations and the occurrence of a differential pressure condition occurring within the system 54. The transducer 68 is in line with the accumulator 66 and is used for monitoring the fluid pressure within the system 54 and produces output signals responsive to variations in fluid pressure. The transducer 68 measures a manifold 70 instead of the individual specimens 56. The manifold 70 is a means of connecting the transducer 68, the accumulator 66, the inlet solenoid valve 60, and a shut-off valve 72. The manifold 70 shown in FIG. 5 is a brass bar with a plurality of holes drilled into it. The shut-off valves 72 may be direct, air, or pilot-operated solenoid valves, air operated ball valves, or gate valves. FIG. 5 illustrates two specimens 56 being tested, and, therefore, two test stations 74 are shown. A typical number of test stations is six per control panel 38. Depending upon the user needs, not all of the stations 74 may be utilized for testing specimens 56.

The system 54 of FIG. 5 also uses a pressure sensing means for sensing a differential pressure condition occurring within the system 54 as a result of a leak developing in each particular specimen 56. The pressure sensing means shown in FIG. 5 is the combination switch 34 shown in FIG. 2 and disclosed in co-pending patent application Ser. No. 07/858,069, filed on even date herewith. In line with each combination switch 34 is the flow control valve 76, also referred to as the needle valve or metering valve. The valve 76 shown in FIG. 5 is the same type of flow control valve disclosed in FIGS. 1 and 2 and is calibrated in the same manner, with a standard set point at two turns open allowing for a flow rate or leak detection rate of 32 cubic centimeters per minute at a standard set pressure of 150 psi. within the system 54.

A pressure feeding means disposed in line with each respective combination switch 34 is used for feeding fluid to each respective specimen 56 in order to bring each respective specimen 56 to the predetermined set pressure. Each station 74 is opened up with an electrically operated, two-way solenoid valve 78 in order to quickly fill the specimen 56 with fluid and feed it with pressure. When the set pressure within the accumulator 66 is equal to the set pressure within the system 54, and the pressure exerted upon each respective specimen 56 is also equal to the pressure within the system 54 as a whole, testing of the specimens 56 can begin. When the set pressure within the entire system 54 is at a balance, then each respective solenoid valve 78 in line with each respective combination switch 34 closes, the computer keeps track of time for each station, and the pressure testing of each specimen 56 commences. The solenoid valves 78 in line with each combination switch 34 stay closed when a leak occurs; these solenoid valves 78 are mainly used for fast filling of each respective specimen 56. The inlet and outlet solenoid valves 60 and 62 that feed to the manifold 70 maintain the set pressure within the system 54 and respond to the demand in each respective specimen 56. The inlet solenoid valve 60 will open up to allow more fluid into the system, 54 or the outlet solenoid valve 62 in line with the tank 64 and having an associated valve 79 for regulating flow, will open up to allow fluid to drain from the system 54 back to the tank 64 if pressure increases in any particular specimen 56 as a result of a temperature rise. The transducer 68 is continuously monitoring and measuring the pressure of the manifold 70. Each combination switch 34 detects a differential pressure condition occurring across the orifice of the respective valve 76 when a leak condition develops in the respective specimen 56. This causes the differential piston within the combination switch 34 to move away from the proximity detector, such as the reed switch, thus disposing the reed switch in a nonconducting, nonsignaling off state and shutting off the indicator light 30. This signals the operator that the particular specimen 56 associated with that respective indicator light 30 has failed the test. However, this does not mean that the other specimens 56 in the other stations 74 have failed their tests. The desk top computer with appropriate interface devices or modules conventional in the art can be used to monitor and control the pressure within the system 54, the solenoid valves 78 of each station 74 as well as the inlet and outlet solenoid valves 60 and 62. When a leak condition develops for a particular station 74, an electrical signal or cpu input 80 is produced and sent to the particular computer being used concomitant with each change in state of each indicator light 30. In addition, the computer continuously samples pressure within the system 54 in order to actuate the opening and closing of the solenoid valves 60 and 62 in response to the transducer 68 readings and the set pressure within the system 54.

Figure 6:
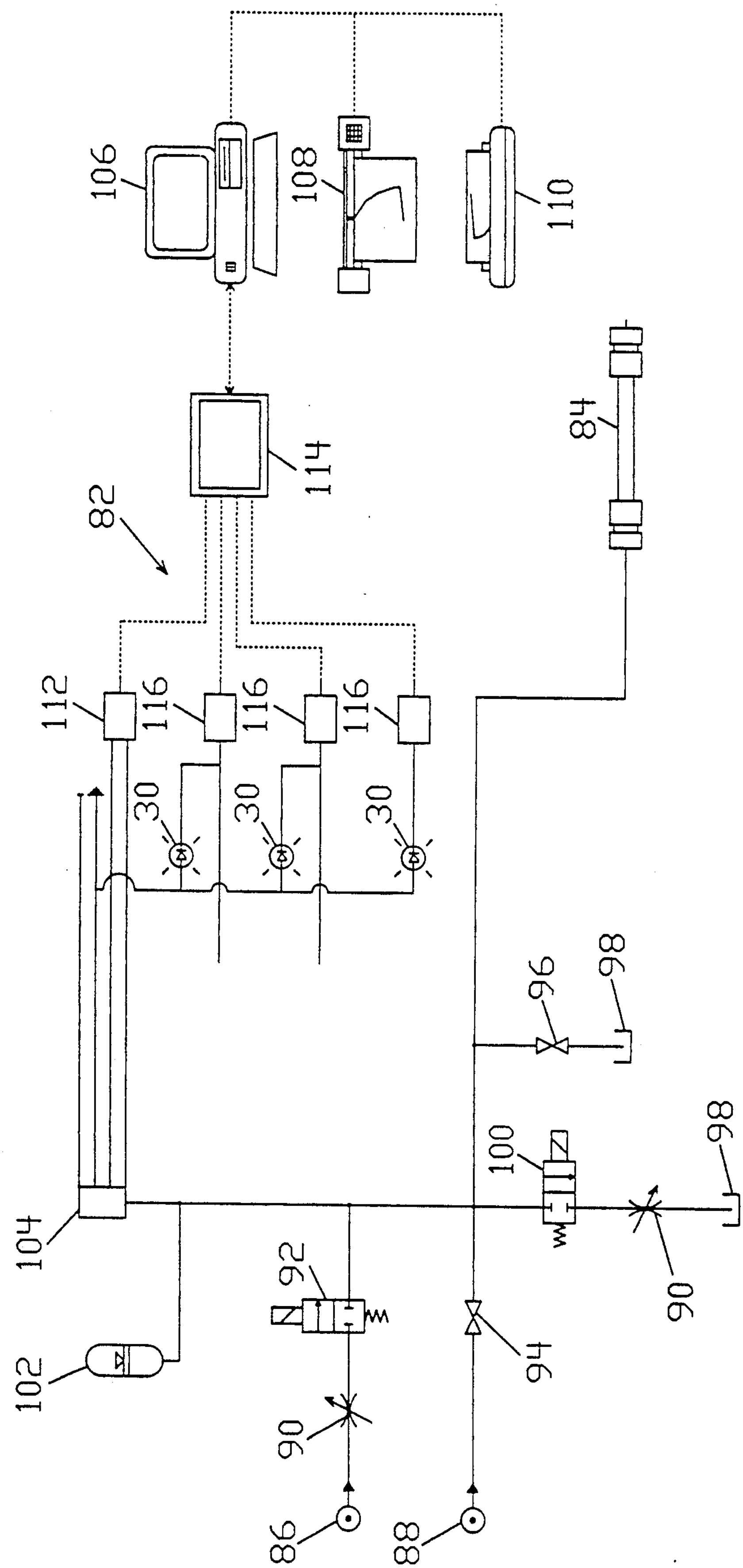
FIG. 6 is an electrical and hydrostatic schematic diagram of a computer-controlled hydrostatic test system using a pressure transducer.

FIG. 6 shows another alternate embodiment of the hydrostatic test system of the present invention. FIG. 6 illustrates a computer-controlled long-term hydrostatic test system 82 showing one station per manifold or control panel 38. If the cabinet 36 of FIG. 3 is used, there will be a total of sixteen control panels 38 with one work station associated with each control panel 38 for a total of sixteen work stations. The system 82 has a means for supplying fluid pressure to the system 82 and a secondary water supply source for supplying fluid pressure to a test specimen 84. The pressure supply means is conventional in the art and may be a long-life, high pressure, high volume pump 86 with a maximum rating of, for example, between 500 and 3,000 psi. The secondary water supply source may be a pump 88 rated at a minimum pressure of between 40 psi to 60 psi. Once the specimen 84 is filled by the water supply pump 88, the high pressure pump 86 brings the system 82 up to the particular set pressure. In line with the pressure supply means is a flow control valve 90 and a first solenoid valve 92. The valve 90 is calibrated to different flows for different needs; typically it is calibrated at 96 cc/min. at 150 psi. The first solenoid valve 92 is an electrically operated two-way valve. In line with the pump 88 is a first shut-off valve 94 to halt fluid flow from the pump 88. A second shut-off valve 96 is used as a manual bleed for decreasing pressure within the system 82 by allowing fluid to drain back to a tank 98 which is conventional in the art. The second shut-off valve 96 is used as a manual quick release of pressure when the test has ended. A second electrically operated two-way solenoid valve 100 is also included for decreasing pressure within the system 82. The second shut-off valve 96 serves as a backup for the second solenoid valve 100 should there be a power failure and can manually drop the pressure within the system 82 if necessary. The first solenoid valve 92 and the second solenoid valve 100 comprise the pressure regulating means for increasing or decreasing pressure within the system 82.

The system 82 shown in FIG. 6 also includes an accumulator 102 and a pressure transducer 104, both of which are conventional in the art. The accumulator 102 shown in FIG. 6 may be the same type of accumulator as illustrated in FIG. 5. The pressure transducer 104 is electrically connected to an electronic control and monitoring means for receiving output signals and data therefrom. The electronic control means may include a desktop computer 106 with a plotter 108 and a printer 110 linked to the computer 106. The system 82 also includes a means to convert the analog input 102 received from the transducer 104 to data and instructions readable and manipulatible by the computer 106, plotter 108, and printer 110. A computer interface module 114 which may be a signal conditioning/isolation interface box can be used to collect a plurality of data channels and transmit the collected data in digital form for use, display, and manipulation by the computer 106, plotter 108, and printer 110. Each transducer 104 in each particular work station is electrically connected to the module 114 so that the operator can serially monitor each transducer 104.

In operation, the accumulator 102 is brought up to the predetermined set pressure and the specimen 84 is also pressurized. The water supply pump 88 insures that a minimum static pressure is attained within the specimen 84 after air is purged from the system 82. Then the high pressure pump 86 is used to bring the system 82 up to a predetermined set pressure. The electronic control means is continually monitoring the transducer 104, and the transducer 104 is monitoring the fluid pressure within the system 82 and the accumulator 102. The computer 106, through appropriate software sends signals 116 (cpu output) to the solenoid valves 92 and 100 to actuate their opening or closing. If the pressure within the system 82 needs decreased or if the test is over, the second solenoid valve 100 is opened to drop the pressure down so that the system 82 can be repressurized for another test. If the demand or expansion of the specimen 84 requires filling of the specimen 84 to maintain the predetermined set pressure, then the electrically-operated first solenoid valve 92 is opened to allow fluid into the system 82 to increase the pressure within the specimen 84 to the set pressure.

As shown in FIG. 6, the computer 106 monitors the transducer 104 in order to determine if the test is still good or not by measuring the number of fill cycles per hour occurring within the system 82. The transducer 104 generates output signals to the computer 106 which the computer 106 evaluates, by appropriate software, in order to signal which of the solenoid valves 92 or 100 to open. Measuring the number of fill cycles per hour determines if a leak condition has occurred within the system 82. Since the embodiment shown in FIG. 6 does not have a differential switch 22 and static switch 24 or a combination switch 34, the transducer 104 is the pressure sensing means for detecting pressure variations and differential pressure conditions occurring within the system 82. When a leak condition in the specimen 84 develops, the transducer 104 generates output signals thereby to the electronic control means, i.e., the particular computer being used, such as the desktop computer 106. After the system 82 is loaded up to the proper predetermined set pressure and the test is running, the time period or interval necessary for introducing new pressure into the system 82 by opening the first solenoid valve 92 grows further and further apart. When a leak condition occurs, the time period or interval for opening the first solenoid valve 92 to allow fluid pressure into the the system 82 to bring the system 82 up to the predetermined set pressure shrinks or grows closer together. The transducer 104 is not actually detecting when a leak condition occurs in the specimen 84; the transducer 104 is monitoring the fluid pressure variations occurring in the system 82 simultaneous with a leak condition occurring in the specimen 84. The transducer 104 produces output signals to the electronic control and monitor means for actuating the first and second solenoid valves 92 and 100 to open or close. The leak is detected by measuring the time interval between each opening of the first solenoid valve 92 or the time intervals of the fill cycles. As the leak grows over time, the interval between successive openings of the first solenoid valve 92 decreases as a kind of oscillation occurs within the system 82 whereby fluid pressure is draining from the system due to a leak in the specimen 84 and fluid pressure is being introduced to the system 82 to maintain the set pressure. When the leak condition occurs, the fluid leaking is equal to the fluid passing through the first solenoid valve 92. This action may not be instantaneous and any volume differences are absorbed by the accumulator 102. This oscillation can be charted by using the plotter 108 and the time intervals for the fill cycles can be output to the printer 110 in a linear and mathematical form. By using the transducer 104 as shown in FIG. 6, an electronic sensor or sensing means is being utilized rather than a mechanical differential sensing means.

Although the invention has been described in terms of several specific embodiments, it is to be understood that other forms of the invention may be readily adapted within the scope of the invention as defined in the appended claims.

We claim:

1. A hydrostatic test system for pressure testing a workpiece, comprising:

a pressure sensing means for sensing a differential pressure condition occurring within the test system;

a calibration means for regulating and varying the flow rate to the pressure sensing means;

an indicator means for visually signaling to an operator that no differential condition exists within the test system and also for signaling when a differential pressure condition occurs within the test system; and means for supplying fluid pressure to the test system.

2. The test system of claim 1 wherein the pressure sensing means includes a combination differential and static pressure switch for sensing both a static pressure condition and a differential pressure condition within the test system.

3. The test system of claim 1 further comprising a plurality of modular, removably securable test station panels, with each test station panel including a plurality of work stations for pressure testing workpieces.

4. A hydrostatic test system for pressure testing a workpiece, comprising:

a pressure sensing means for sensing a differential pressure condition occurring within the test system;

a pressure regulating means for maintaining a set pressure within the test system;

an accumulator for storing fluid under pressure and for absorbing fluid concomitant with the occurrence of a differential pressure condition;

a high accuracy transducer for monitoring the fluid pressure within the test system and producing output signals responsive to variations in fluid pressure within the system;

a pressure supply means for supplying fluid pressure to the test system;

pressure feeding means for regulating and feeding fluid to the workpiece in order to bring the workpiece to a predetermined set pressure; and an electronic control means for receiving output signals from the high accuracy transducer and for monitoring and operating the pressure regulating means and the pressure feeding means.

5. The test system of claim 4 wherein the pressure sensing means includes a combination differential and static pressure switch for sensing both a static pressure condition and a differential pressure condition within the test system.

6. A computer-controlled hydrostatic test system for pressure testing a workpiece, comprising:

a pressure sensing means for detecting variations in pressure occurring within the test system and generating output signals thereby;

an accumulator for holding a fluid at a set pressure equal to the set pressure within the test system;

a pressure regulating means for increasing or decreasing the pressure within the test system by allowing fluid to enter the test system or allowing fluid to drain from the system;

an electronic control means for monitoring and processing the output signals from the pressure sensing means and for actuating the pressure regulating means; and a means for supplying fluid pressure to the test system.

7. The test system of claim 6 wherein the pressure sensing means is a pressure transducer electrically connected to the electronic control means.

8. The test system of claim 7 wherein the pressure transducer continuously monitors the pressure within the test system and produces output signals to the electronic control means upon detecting pressure variations-,occurring therein.

* * * * *